Feb. 4, 1947.                J. LONGWORTH                2,415,105
                        STEM LOCK FOR DIAL GAUGES
                           Filed June 11, 1945
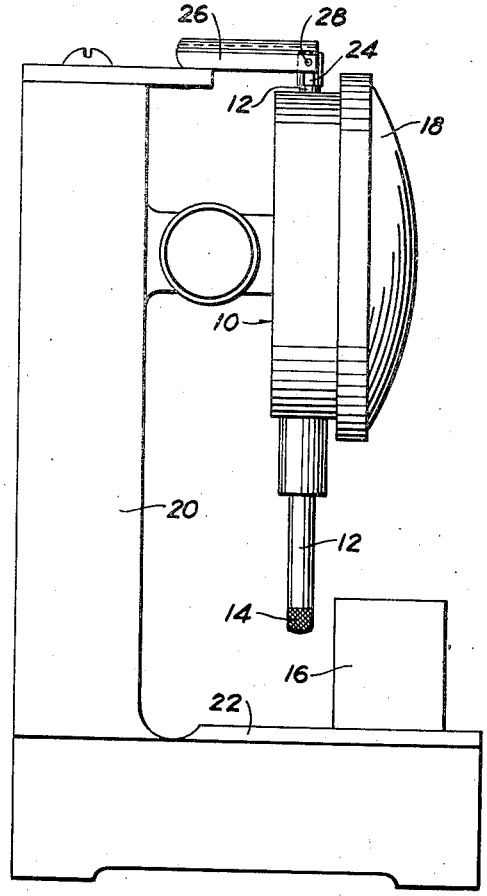
Fig. 1.
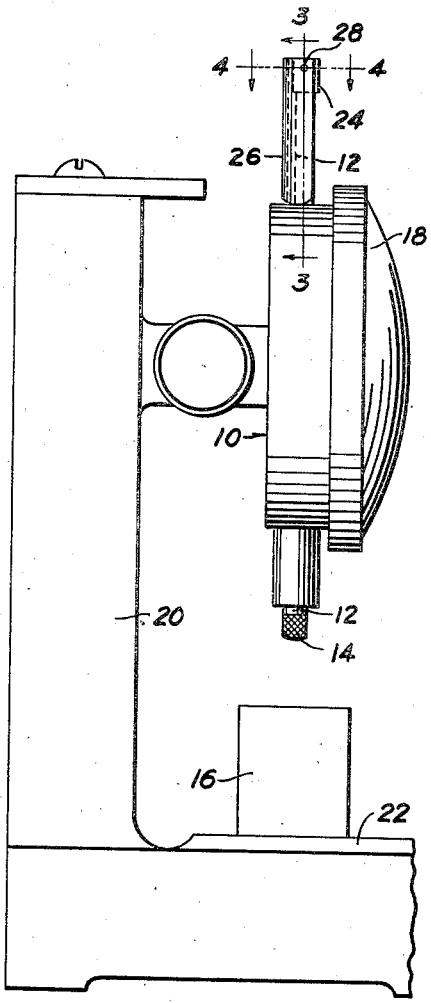
Fig. 2.
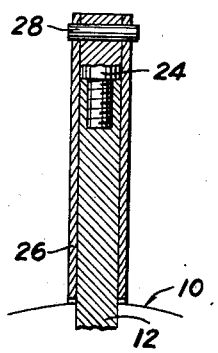
Fig. 3.
Fig. 4.
Inventor
JOHN LONGWORTH Patented Feb. 4, 1947

2,415,105

UNITED STATES PATENT OFFICE 2,415,105

STEM LOCK FOR DIAL GAUGES

John Longworth, Haddon Heights, N. J.

Application June 11, 1945, Serial No. 598,742

1 Claim. (Cl. 33—147)

(Granted under the act of March 3, 1883, as amended April 30, 1928; 370 O. G. 757)

The invention described herein may be manufactured and used by or for the Government for governmental purposes, without the payment to me of any royalty thereon.

My invention relates to dial indicator and other gauges of the retractable stem type and it has special reference to selectively effective means for holding the stems of such gauges fully retracted.

Broadly stated, the object of my invention is to improve the operating effectiveness of dial indicator and other retractable stem gauges.

A more specific object is to safeguard the stems of such gauges from damage during set up of the work to be measured.

A further object is to provide improved means for locking the stems of such gauges in their fully retracted positions.

A still further object is to provide a gauge stem lock of improved design and enhanced usefulness.

In practicing my invention I attain the foregoing and other objects and advantages by providing a gauge stem lock that has the unique construction and the superior performance presently to be described. One preferred form of my improved device is shown by the accompanying drawing wherein:

Fig. 1 is a side view of a conventional dial indicator gauge showing my new lock installed on the stem thereof and depicting same released to allow the full stem protrusion represented;

Fig. 2 is a similar showing of the new lock when functioning to hold the gauge stem fully retracted;

Fig. 3 is an enlarged section on line 3—3 of Fig. 2 showing certain constructional details of the lock; and Fig. 4 is an enlarged section on line 4—4 of Fig. 2 showing further details of the lock parts.

Gauges with which lock is useable

Retractable stem gauges of a wide variety of types may be benefited by my improved locking device. The dial indicator gauge of Figs. 1-2 is illustrative of these. It comprises a case body 10 having a stem 12 longitudinally movable therethrough. The "gauging" or lower end of this stem is normally protruded by spring action, as shown by Fig. 1, while the upper or "follower" end is correspondingly retracted.

Affixed to the stem gauging end is a tip 14 for contacting the surface of work 16 to be measured. Indication of the thickness or other characteristic of such work is given by the usual pointer (not shown) that is rotated by movement of the stem 12 through case 10 and that registers with a graduated scale (likewise not shown) also within the case. A transparent case cover 18 allows both this scale and the pointer to be viewed by the gauge operator.

Supporting this illustrative gauge of Figs. 1-2 is a pedestal or other conventional mount 20 upon the base 22 of which the work 16 to be measured is shown as resting. As the description proceeds it will become apparent that this arrangement is representative of a number of other extensively used gauge set-ups wherein full protrusion of stem 12, as indicated by Fig. 1, prevents insertion of the work 16 until the stem has been retracted away from base 22 as shown by Fig. 2.

Stem 12 is urged downwardly by an internal spring (not shown); hence unless the named separation is first effected, insertion of work 16 between the gauge and the reference platform 22 will mechanically push stem tip 14 to one side, typically bending or even breaking the stem and thereby both damaging and impairing operativeness of the complete gauge.

Past practice in effecting the required separation has been to utilize toggle clamps (not shown) in a way to retract the entire indicator 10, along with the stem, away from the gauging position. Such an arrangement involves mechanical complications and inconveniences that make it far less desirable than the represented stationary mounting of gauge body 10 which use of my improved stem lock makes possible.

My improved stem lock

In the illustrative construction shown, my new stem lock replaces the dust cap and a stem restraining nut thereunder (not shown) with which the follower end of the gauge stem 12 typically is provided. The lock comprises only three parts: (a) a support stud 24 screwed into the threaded restraining nut opening (see Fig. 3) in gauge stem 12's top; (b) a body or latch 26 related to the stud and the stem 12 in the manner shown; and (c) a pin 28 which hingedly attaches the latch to the stud.

When the latch is released, as shown in Fig. 1, the gauge is operable for measuring the work 16 (after same has been positioned as shown in Fig. 2) in the same manner as were the stem lock not installed on the gauge. Under this lock-released condition, stem 12 is free to move throughout its complete range of travel and the intended measuring functions of the gauge are unhampered.

In order to lock stem 12 in the retracted position, it is merely necessary to pull the stem upwardly (as shown in Fig. 2) and then swing the latch 26 inwardly to the position of Fig. 2 wherein the latch's lower end abuts the top of gauge case 10 and thereby restrains the gauge stem against downward movement under spring action. Under this lock-engaged condition the stem tip 14 is positively held out of contact with the work 16 and the work may therefore be slid into gauging position without contacting or damaging the gauge stem.

Release of the lock is effected at will merely by pushing latch 26's lower end to one side and permitting the parts to assume the condition represented by Fig. 1.

Latch 26's length will, of course, be chosen to position the stem 12 at or near its fully retracted position, as depicted by Fig. 2. With such a choice and by proper selection of threads on stud 24 the entire lock unit is readily installable in place of the conventional dust cap and a stem restraining nut thereunder (not shown) on dial indicator and other gauges of the retractable stem type.

All lock parts may satisfactorily be made of brass, steel or other suitable metal and the design details thereof may be varied to suit convenience.

Summary

From the foregoing it will be seen that I have provided selectively effective means for holding the stems of dial indicator and other gauges fully retracted; that I have safeguarded the stems of such gauges from damage during set up of the work to be measured; and that I have provided a gauge stem lock of improved design and enhanced usefulness.

My invention is therefore broad in its adaption and hence is not to be restricted to the specific form here shown by way of illustration.

I claim:

In combination, a dial indicator gauge comprising a case, a stem extending through said case for longitudinal movement with respect thereto and having gauging and follower ends that protrude from opposite case sides, resilient means urging said stem in a direction to protrude its said gauging end from the case to a maximum and to withdraw its said follower end toward the case, and a stem lock latch hingedly attached at one of its ends to the gauge stem's said follower end for selective swinging thereabout from an "unlock" position away from the stem body where the aforesaid stem movement is in no way interfered with to a "lock" position paralleling the stem body where the latch's free end abuts said gauge case beside the stem and thereby holds the stem against said resilient means with the gauging end thereof withdrawn toward the case and the follower end thereof correspondingly protruded from the case.

JOHN LONGWORTH.

REFERENCES CITED

The following references are of record in the file of this patent:

UNITED STATES PATENTS

| Number | Name | Date |
| --- | --- | --- |
| 1,100,573 | Keefer | June 16, 1914 |

FOREIGN PATENTS

| Number | Country | Date |
| --- | --- | --- |
| 164,575 | Swiss | Dec. 16, 1933 |